US010999535B2

(12) United States Patent
Shuden et al.

(10) Patent No.: US 10,999,535 B2
(45) Date of Patent: May 4, 2021

(54) RECORDING MEDIUM, METHOD, AND INFORMATION PROCESSING DEVICE FOR GENERATING THREE-DIMENSIONAL SYNTHESIZED VIDEO OF INFORMATION RELATED TO SUBJECTS WITH BACKGROUND AREA BASED ON FREE VIEWPOINT VIDEO

(71) Applicant: FUJITSU LIMITED, Kawasaki (JP)

(72) Inventors: Takaharu Shuden, Fujisawa (JP); Kazumi Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/700,056

(22) Filed: Dec. 2, 2019

(65) Prior Publication Data

US 2020/0106968 A1 Apr. 2, 2020

Related U.S. Application Data

(63) Continuation of application No. PCT/JP2017/026909, filed on Jul. 25, 2017.

(51) Int. Cl.
*H04N 5/272* (2006.01)
*G06T 7/292* (2017.01)

(52) U.S. Cl.
CPC .......... *H04N 5/2723* (2013.01); *G06T 7/292* (2017.01); *G06T 2207/10016* (2013.01)

(58) Field of Classification Search
CPC .......... H04N 5/2723; G06T 7/292; G06T 2207/10016

(Continued)

(56) References Cited

U.S. PATENT DOCUMENTS

2009/0278948 A1 11/2009 Hayashi
2009/0315978 A1* 12/2009 Wurmlin .............. G06T 7/20
348/43

(Continued)

FOREIGN PATENT DOCUMENTS

JP 2009-271732 A 11/2009
JP 2010-193458 A 9/2010

(Continued)

OTHER PUBLICATIONS

International Search Report and Written Opinion of the International Searching Authority, with Partial Translation (Form PCT/ISA/210, 220, and 237), mailed in connection with PCT/JP2017/026909 and dated Oct. 3, 2017. (14 pages).

(Continued)

*Primary Examiner* — Susan E. Hodges
(74) *Attorney, Agent, or Firm* — Fujitsu Patent Center

(57) ABSTRACT

A non-transitory computer-readable recording medium having stored therein a video generation program for causing a computer to execute a process comprising: tracking a position of a three-dimensional model of each of a plurality of subjects in a three-dimensional space generated by combining, for the subjects, a plurality of imaging frames captured by a plurality of cameras in a plurality of directions; obtaining positional information of the subjects included in the three-dimensional space; obtaining information related to the subjects; and generating synthesized video by combining the information related to the subjects with a background area near the subjects based on the positional information of the subjects among areas of free viewpoint video generated on the basis of the three-dimensional model of each of the subjects.

15 Claims, 16 Drawing Sheets

(58) Field of Classification Search
USPC .......................................................... 348/157
See application file for complete search history.

(56) References Cited

U.S. PATENT DOCUMENTS

| | | |
|---|---|---|
| 2010/0208942 A1 | 8/2010 | Porter et al. |
| 2014/0059588 A1* | 2/2014 | Sakamoto .......... G06Q 30/0241 |
| | | 725/32 |
| 2016/0192009 A1* | 6/2016 | Sugio .................. G06K 9/3241 |
| | | 725/32 |
| 2017/0072283 A1* | 3/2017 | Davisson ................ A63B 43/00 |
| 2017/0124769 A1* | 5/2017 | Saito .................. H04N 5/23238 |

FOREIGN PATENT DOCUMENTS

| | | |
|---|---|---|
| JP | 2012-48639 A | 3/2012 |
| JP | 2014-41259 A | 3/2014 |
| WO | 2016/017121 A1 | 2/2016 |

OTHER PUBLICATIONS

JPOA—Office Action of Japanese Patent Application No. 2019-532254 dated Jan. 5, 2021 with Machine Translation.

* cited by examiner

FIG. 3

| CAMERA IDENTIFICATION DATA | VIDEO DATA |
|---|---|
| CAMERA 10a | VIDEO DATA IMAGED BY CAMERA 10a |
| CAMERA 10b | VIDEO DATA IMAGED BY CAMERA 10b |
| CAMERA 10c | VIDEO DATA IMAGED BY CAMERA 10c |
| ... | ... |

| USER ID | NAME | HOBBY/INTEREST | BASKETBALL EXPERIENCE |
|---|---|---|---|
| U101 | FUJITSU TARO | PERSONAL COMPUTER | 10 YEARS |
| U102 | FUJITSU HANAKO | AIR CONDITIONER | NONE |
| ... | ... | ... | ... |

| CAMERA IDENTIFICATION DATA | CAMERA PARAMETER |
|---|---|
| CAMERA 10a | CAMERA PARAMETER OF CAMERA 10a |
| CAMERA 10b | CAMERA PARAMETER OF CAMERA 10b |
| CAMERA 10c | CAMERA PARAMETER OF CAMERA 10c |
| ... | ... |

| CONTENT ID | ADVERTISER | HOBBY/INTEREST | CONTENT DATA |
|---|---|---|---|
| C101 | ADVERTISER XX | PERSONAL COMPUTER | XX.jpg |
| C102 | ADVERTISER XX | AIR CONDITIONER | XX.mp4 |
| ... | ... | ... | ... |

| PLAYER IDENTIFICATION DATA | PLAYER-RELATED DATA |
|---|---|
| 2a | DATA RELATED TO PLAYER WITH PLAYER IDENTIFICATION DATA "2a" |
| 2b | DATA RELATED TO PLAYER WITH PLAYER IDENTIFICATION DATA "2b" |
| 2c | DATA RELATED TO PLAYER WITH PLAYER IDENTIFICATION DATA "2c" |
| ... | ... |
| 2f | DATA RELATED TO PLAYER WITH PLAYER IDENTIFICATION DATA "2f" |
| 2g | DATA RELATED TO PLAYER WITH PLAYER IDENTIFICATION DATA "2g" |
| 2h | DATA RELATED TO PLAYER WITH PLAYER IDENTIFICATION DATA "2h" |
| ... | ... |

| SPACE ID | ARRANGEMENT COORDINATES | SIZE |
|---|---|---|
| K101 | $(X_1, Y_1, Z_1)$ | VERTICAL: ○○pixel<br>HORIZONTAL: ○○pixel |
| K102 | $(X_2, Y_2, Z_2)$ | VERTICAL: ○○pixel<br>HORIZONTAL: ○○pixel |
| ... | ... | ... |

| PLAYER IDENTIFICATION DATA | TRACKING DATA |
|---|---|
| 2a | TRACKING DATA OF PLAYER WITH PLAYER IDENTIFICATION DATA "2a" |
| 2b | TRACKING DATA OF PLAYER WITH PLAYER IDENTIFICATION DATA "2b" |
| 2c | TRACKING DATA OF PLAYER WITH PLAYER IDENTIFICATION DATA "2c" |
| ... | ... |
| 2f | TRACKING DATA OF PLAYER WITH PLAYER IDENTIFICATION DATA "2f" |
| 2g | TRACKING DATA OF PLAYER WITH PLAYER IDENTIFICATION DATA "2g" |
| 2h | TRACKING DATA OF PLAYER WITH PLAYER IDENTIFICATION DATA "2h" |
| ... | ... |

140g

RECORDING MEDIUM, METHOD, AND INFORMATION PROCESSING DEVICE FOR GENERATING THREE-DIMENSIONAL SYNTHESIZED VIDEO OF INFORMATION RELATED TO SUBJECTS WITH BACKGROUND AREA BASED ON FREE VIEWPOINT VIDEO

CROSS-REFERENCE TO RELATED APPLICATION

This application is a continuation application of International Application PCT/JP2017/026909 filed on Jul. 25, 2017 and designated the U.S., the entire contents of which are incorporated herein by reference.

FIELD

The embodiment discussed herein is related to a video generation program and the like.

BACKGROUND

In a technique called free viewpoint video, three-dimensional information of a subject is analyzed from multi-viewpoint images captured by a plurality of cameras with different viewpoints.

Japanese Laid-open Patent Publication No. 2012-048639 is disclosed as related art.

SUMMARY

According to an aspect of the embodiments, a non-transitory computer-readable recording medium having stored therein a video generation program for causing a computer to execute a process comprising: tracking a position of a three-dimensional model of each of a plurality of subjects in a three-dimensional space generated by combining, for the subjects, a plurality of imaging frames captured by a plurality of cameras in a plurality of directions; obtaining positional information of the subjects included in the three-dimensional space; obtaining information related to the subjects; and generating synthesized video by combining the information related to the subjects with a background area near the subjects based on the positional information of the subjects among areas of free viewpoint video generated on the basis of the three-dimensional model of each of the subjects.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an exemplary data structure of a video buffer;

FIG. 4 is a diagram illustrating an exemplary data structure of a user management table;

FIG. 5 is a diagram illustrating an exemplary data structure of a camera parameter table;

FIG. 6 is a diagram illustrating an exemplary data structure of an advertisement management table;

FIG. 7 is a diagram illustrating an exemplary data structure of a player data table;

FIG. 8 is a diagram illustrating an exemplary data structure of a space management table;

FIG. 10 is a diagram illustrating an exemplary data structure of a tracking table;

DESCRIPTION OF EMBODIMENTS

For example, by generating free viewpoint video on the basis of a result of the analysis of the three-dimensional information, it becomes possible to observe the video of the subject from a free viewpoint position, direction, or the like.

The technique of the free viewpoint video is used for watching various sports, such as soccer, basketball, and baseball. For example, with the free viewpoint video being generated using video of a plurality of cameras installed at a venue where a soccer game is held, it becomes possible to view a ball and players running around the pitch from a free viewpoint.

Furthermore, desired advertisement is displayed in the free viewpoint video as the free viewpoint video. For example, video viewed from a received viewpoint is generated, an area in which advertisement is inserted is determined from a background area of the video, and video with the advertisement attached to the determined area is synthesized. For example, among the areas in which advertisement can be inserted, an area having a size with which the desired advertisement can be displayed and also having an angle with which the advertisement can be easily viewed from the received viewpoint is set as an advertisement insertion area.

However, there may be a problem that information related to the subject may not be displayed in the free viewpoint video.

An advertisement is to be combined, and an area where the advertisement is easily viewed is set as an advertisement insertion area. However, in a case where the information to be combined is information related to a specific subject in the video, it is not necessarily appropriate to combine the information in the insertion area.

For example, in a case where information related to a player A is displayed at a position completely unrelated to the player A in free viewpoint video of a sport game, it is difficult to watch the game while concurrently viewing motions of the player and the information at a time.

Examples of the information related to the player A include data of the current game, past results, SNS streaming for the player A, advertisement of a sponsor, and the like in a contract with the player A.

A video generation program, a method of generating video, and a video generation device capable of displaying information related to a subject in free viewpoint video may be provided.

Hereinafter, an example of a video generation program, a method of generating video, and a video generation device according to an embodiment will be described in detail with reference to the accompanying drawings. Note that the present embodiment is not limited to the example.

Example

Figure 1:
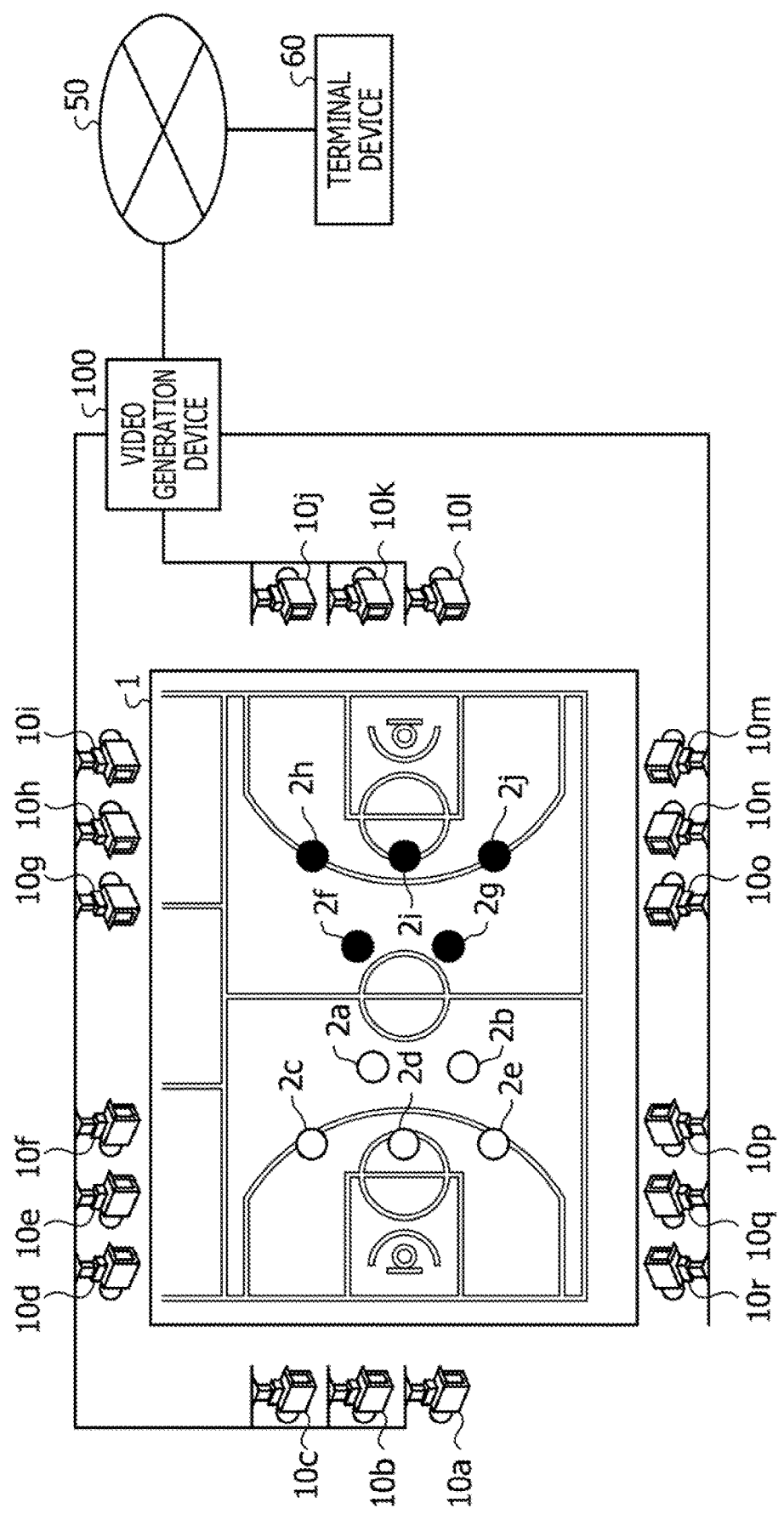
FIG. 1 is a diagram illustrating a system according to the present example.

FIG. 1 is a diagram illustrating a video generation system according to the present example. As illustrated in FIG. 1, the video generation system includes cameras 10a to 10r, a terminal device 60, and a video generation device 100.

The system may include a camera other than the cameras 10a to 10r. The cameras 10a to 10r will be collectively referred to as a camera 10 as appropriate. The camera 10 is connected to the video generation device 100. Furthermore, the video generation device 100 is connected to the terminal device 60 via a network 50. The system may include a terminal device other than the terminal device 60.

In a field 1, players 2a to 2j perform. In the following descriptions, the players 2a to 2j will be collectively referred to as a player 2 as appropriate. Although an exemplary case where the player 2 plays a basketball game in the field 1 is illustrated in FIG. 1 as an example, it is not limited thereto. The present embodiment may also be applied to, in addition to the basketball game, competitive sports such as soccer, volleyball, baseball, and athletic sports, dance, musical performance/group singing competitions, and the like.

The camera 10 is a camera that outputs, to the video generation device 100, video data in an imaging range captured at a predetermined frame rate (frames per second (FPS)). The video data includes a plurality of imaging frames. In the case of outputting video data, the camera 10 adds camera identification data that uniquely identifies the camera 10 to the video data.

The terminal device 60 is a device that receives information associated with free viewpoint video from the video generation device 100 and displays the information. For example, a user operates the terminal device 60 to notify the video generation device 100 of the viewpoint position of the free viewpoint video, and views the free viewpoint video on the basis of the notified viewpoint position. In the following descriptions, the viewpoint position of the free viewpoint video specified by the user of the terminal device 60 will be referred to as a "virtual camera parameter".

The video generation device 100 is a device that generates free viewpoint video on the basis of video data captured by the camera 10 and the virtual camera parameter notified from the terminal device 60. The video generation device 100 transmits the data of the free viewpoint video to the terminal device 60 for display.

Figure 2:
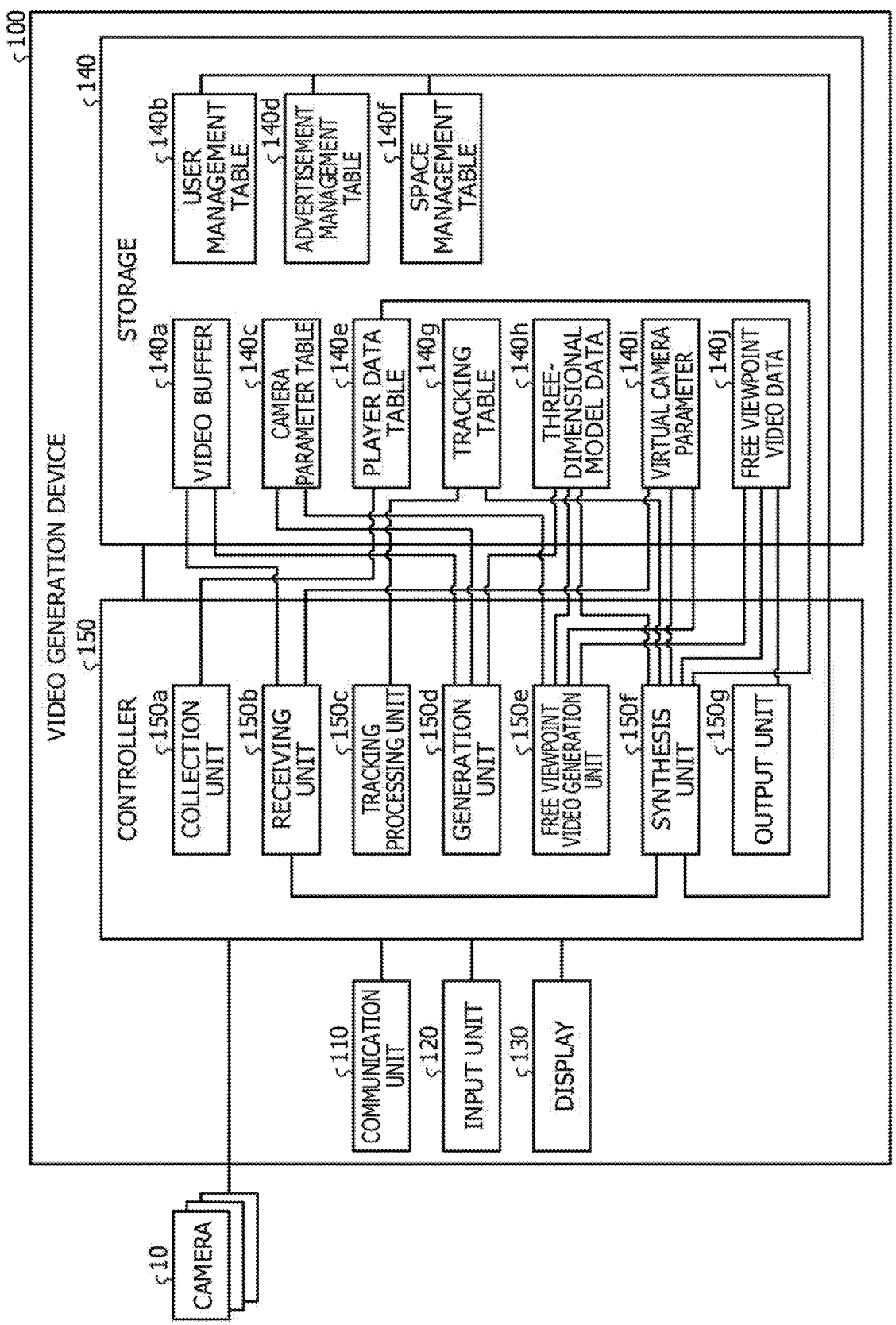
FIG. 2 is a functional block diagram illustrating a configuration of a video generation device according to the present example.

FIG. 2 is a functional block diagram illustrating a configuration of the video generation device according to the present example. As illustrated in FIG. 2, the video generation device 100 is connected to the camera 10. The video generation device 100 includes a communication unit 110, an input unit 120, a display 130, a storage 140, and a controller 150.

The communication unit 110 is a processing unit that communicates with the terminal device 60 via the network 50. The communication unit 110 corresponds to a communication device. The controller 150 to be described later exchanges data with the terminal device 60 via the communication unit 110.

The input unit 120 is an input device for inputting various kinds of data to the video generation device 100. The input unit 120 corresponds to, for example, a keyboard, a mouse, a touch panel, or the like.

The display 130 is a display device that displays data output from the controller 150. The display 130 corresponds to, for example, a liquid crystal display, a touch panel, or the like.

The storage 140 includes a video buffer 140a, a user management table 140b, a camera parameter table 140c, an advertisement management table 140d, a player data table 140e, and a space management table 140f. The storage 140 includes a tracking table 140g, three-dimensional model data 140h, virtual camera parameters 140i, and free viewpoint video data 140j. The storage 140 corresponds to a semiconductor memory element such as a random access memory (RAM), a read-only memory (ROM), and a flash memory, or a storage device such as a hard disk drive (HDD).

The video buffer 140a is a buffer that stores video data received from the camera 10. FIG. 3 is a diagram illustrating an exemplary data structure of the video buffer. As illustrated in FIG. 3, the video buffer 140a associates camera identification data with video data. The camera identification data is data that uniquely identifies the camera 10. The video data is video data captured by the corresponding camera 10. For example, the video data of the record in the first row is video data captured by the camera 10a.

The user management table 140b is a table that retains information associated with the user who operates the terminal device 60. FIG. 4 is a diagram illustrating an exemplary data structure of the user management table. As Illustrated in FIG. 4, the user management table 140b associates user identification data (ID), a name, a hobby, and basketball experience with each other. The user ID represents information that uniquely identifies a user. The name represents a name of the user. The hobby/interest represents information indicating a hobby or interest of the user. The basketball experience represents information indicating whether or not the corresponding user has basketball experience. For example, in the case of having basketball experience, the years of experience are registered in the field of the basketball experience. In the case of having no basketball experience, "none" is registered in the field of the basketball experience.

The camera parameter table 140c is a table that retains camera parameters of the camera 10. FIG. 5 is a diagram illustrating an exemplary data structure of the camera parameter table. As illustrated in FIG. 5, the camera parameter table 140c associates camera identification data with a camera parameter. The camera identification data is data that uniquely identifies the camera 10. For example, the camera parameters include internal parameters and external parameters of the camera 10. The internal parameters include information such as a focal length of the camera 10. The external parameters include information such as three-dimensional coordinates of the camera 10 and a direction of the camera 10.

The advertisement management table 140d is a table that retains content information to be used in the case where an advertiser advertises to the user. FIG. 6 is a diagram illustrating an exemplary data structure of the advertisement management table. As illustrated in FIG. 6, the advertisement management table 140d associates content ID, an advertiser, a hobby, and content data with each other.

The content ID represents information that uniquely identifies advertisement content. The advertiser represents information indicating an advertiser of the content. The hobby/interest represents a hobby or interest of the user who is a target of the content. The content data represents data of the content to be advertisement. For example, the content with the content ID of "C101" is content targeted at a user whose hobby is a "personal computer". The content data may be still image data, or may be video data.

The player data table 140e is a table that retains various kinds of data related to players. FIG. 7 is a diagram illustrating an exemplary data structure of the player data table. As illustrated in FIG. 7, the player data table 140e associates player identification data with player-related data. The player identification data is information that uniquely identifies a player.

The player-related data includes various kinds of information related to players. For example, the player-related data includes a "player profile", "current game data", "past game results", "inter-player performance", "predicted data", "comments on a player", "data of a sponsor in a contract with a player", and "related link data". Although an example of each piece of the information included in the player-related data will be described below, it is not limited thereto.

The "player profile" includes physical information of the player, team affiliation history, and the like. The "current game data" is information including a shooting success rate, a shooting blocking rate, and the like of the player in the game that the player is currently playing.

The "past game results" Includes Information such as a shooting success rate and a shooting blocking rate in the past games, scores in the season, scores in the career, the number of steals, and ranking of players in the league. The "inter-player performance" includes inter-player performance between the player and another player (enemy), or inter-player performance between the player and another player (ally). For example, the inter-player performance between the player and the other player (enemy) includes the number of steals and the number of pass blocking. The inter-player performance between the player and the other player (ally) includes a pass success rate with the teammate and the like.

The "predicted data" includes a probability that the player moves from one motion to the next motion, a probability of scoring, and the like. The "comments on a player" corresponds to a social networking service (SNS) message or the like directed to the player who is playing the game. The "data of a sponsor in a contract with a player" is advertisement data related to the sponsor that the player is in a contract with.

The "related link data" includes commentary on the play for beginners, link information to an interview page of the player on the Internet, and the like.

The space management table 140f is information that defines a space in which advertisement content is to be arranged on the free viewpoint video. FIG. 8 is a diagram illustrating an exemplary data structure of the space management table. As illustrated in FIG. 8, the space management table 140f associates space ID, arrangement coordinates, and a size with each other. The space ID represents information that uniquely identifies a space in which an advertisement is to be arranged. The arrangement coordinates represent information indicating coordinates of a space on the three-dimensional model data 140h. The size represents information indicating a size of the space.

Figure 9:
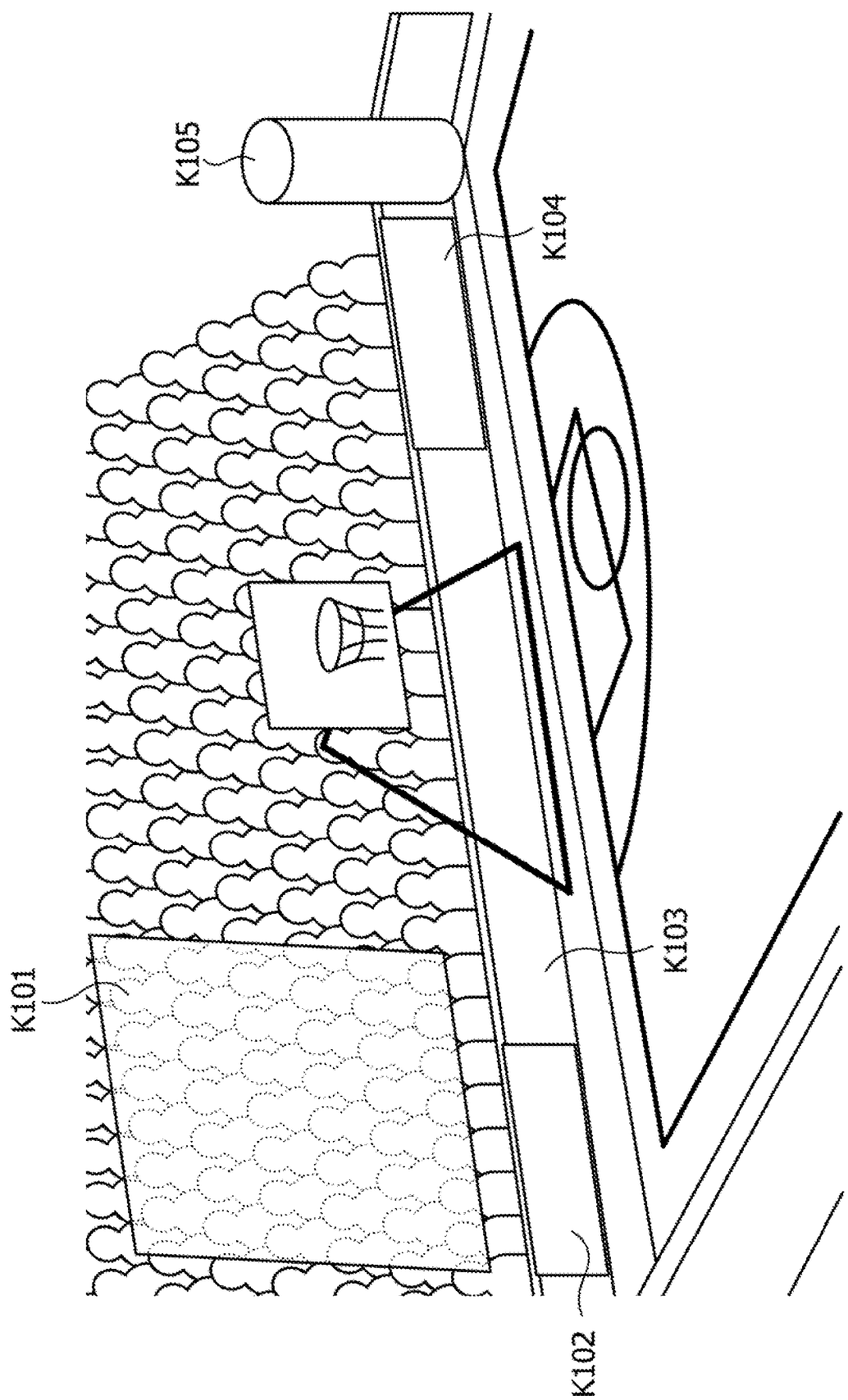
FIG. 9 is a diagram illustrating an exemplary space defined by the space management table.

FIG. 9 is a diagram illustrating an exemplary space defined by the space management table. As illustrated in FIG. 9, spaces K101, K102, K103, K104, and K105 are designated in the game venue (venue reproduced by the three-dimensional model data 140h). For example, the space K101 is a space set in spectator seats. The spaces K102, K103 and K104 are spaces set in the area under the spectator seats. The space K105 is a space set on a virtual three-dimensional object. Note that the spaces are not limited to those illustrated in FIG. 9. For example, a space may be arranged on the floor of the court or the like.

The tracking table 140g is a table that retains tracking data of each player 2. FIG. 10 is a diagram illustrating an exemplary data structure of the tracking table. As illustrated in FIG. 10, the tracking table 140g associates player identification data with tracking data. The player identification data is data that uniquely identifies the player 2. The tracking data is data that associates, with respect to the player 2, the time with two-dimensional coordinates (or three-dimensional coordinates) of the player 2.

Furthermore, although illustration is omitted in FIG. 10, the tracking table 140g may retain tracking data of a ball (e.g., a basketball). The tracking data of a ball is data that associates the time with two-dimensional coordinates (or three-dimensional coordinates) of the ball.

The three-dimensional model data 140h associates the time with a three-dimensional model of the player 2 on the field 1. Player identification data is assigned to the three-dimensional model of the player 2 included in the three-dimensional model data 140h.

The virtual camera parameters 140i include parameters of a virtual camera to be a reference in generating free viewpoint video. The parameters of the virtual camera include three-dimensional coordinates (X, Y, Z) of the virtual camera and data of a direction "θ" of the virtual camera. For example, the virtual camera parameters 140i are notified from the terminal device 60.

The free viewpoint video data 140j is data of the free viewpoint video captured by the virtual camera to be arranged on the three-dimensional model data 140h. The free viewpoint video is two-dimensional video. For example, the free viewpoint video captured by the virtual camera is generated from the video captured by the actual camera 10 and the three-dimensional model data 140h.

The description returns to the description of FIG. 2. The controller 150 includes a collection unit 150a, a receiving unit 150b, a tracking processing unit 150c, a generation unit 150d, a free viewpoint video generation unit 150e, a synthesis unit 150f, and an output unit 150g. The controller 150 can be implemented by a central processing unit (CPU), a micro processing unit (MPU), or the like. In addition, the controller 150 may also be implemented by hard wired logic such as an application specific integrated circuit (ASIC) and a field programmable gate array (FPGA).

The collection unit 150a is a processing unit that periodically accesses a server device or the like (not illustrated) via the network 50 and collects player-related data in the player data table 140e. The collection unit 150a registers the collected player-related data in the player data table 140e.

The receiving unit 150b is a processing unit that receives video data from the camera 10. The receiving unit 150b stores, in the video buffer 140a, the camera identification data and the video data in association with each other.

Furthermore, the receiving unit 150b receives the user ID and the virtual camera parameter from the terminal device

60. The receiving unit 150*b* outputs the user ID to the synthesis unit 150*f*. The receiving unit 150*b* registers, in the storage 140, the virtual camera parameter as the virtual camera parameter 140*i*. Furthermore, in a case where the virtual camera parameter to be updated is received from the terminal device 60, the receiving unit 150*b* updates the virtual camera parameter 140*i* with the received virtual camera parameter.

The tracking processing unit 150*c* is a processing unit that generates tracking data of each player 2. The tracking processing unit 150*c* stores, in the tracking table 140*g*, the tracking data and the player identification data of the player 2 in association with each other.

For example, the tracking processing unit 150*c* detects a characteristic portion (color, etc.) of the player 2 from the imaging frame of the video data to be stored in the video buffer 140*a*, and calculates the two-dimensional coordinates of the player 2 on the basis of the principle of a stereo camera (triangulation) with two cameras 10. The tracking processing unit 150*c* calculates a coordinate in the vertical direction on the basis of the height of the player 2.

The tracking processing unit 150*c* may further link the player identification data of individual players using information such as a uniform number. Alternatively, the player 2 may wear a sensor that generates signals in advance, and the tracking processing unit 150*c* may calculate the two-dimensional coordinates of the player 2 using a plurality of receivers (not illustrated) that receives the signals. Alternatively, the tracking processing unit 150*c* may receive tracking data from an external tracking system (not illustrated) that generates tracking data of the player 2, and may register it in the tracking table 140*g*.

The generation unit 150*d* is a processing unit that generates the three-dimensional model data 140*h* by combining imaging frames of respective video data stored in the video buffer 140*a* and generating three-dimensional models of respective players 2. The generation unit 150*d* obtains a camera parameter of each camera 10 from the camera parameter table 140*c*. Hereinafter, an exemplary process performed by the generation unit 150*d* will be described.

The generation unit 150*d* obtains a difference between the preceding and following imaging frames, thereby separating the area of the imaging frame into a "moving area" and a "non-moving area". The moving area corresponds to the area of the moving player 2 and the ball, and the non-moving area corresponds to the area of the field 1 and the background other than the player 2 and the ball.

The generation unit 150*d* calculates three-dimensional coordinates of each point in the moving area on the basis of the principle of the stereo image, thereby generating a three-dimensional model (depth data) of the moving area. The generation unit 150*d* repeatedly executes the process described above for each moving area for each time, thereby generating a three-dimensional model of the player 2 for each time. In the following descriptions, the three-dimensional model of the player 2 will be referred to as a "player model".

Figure 11:
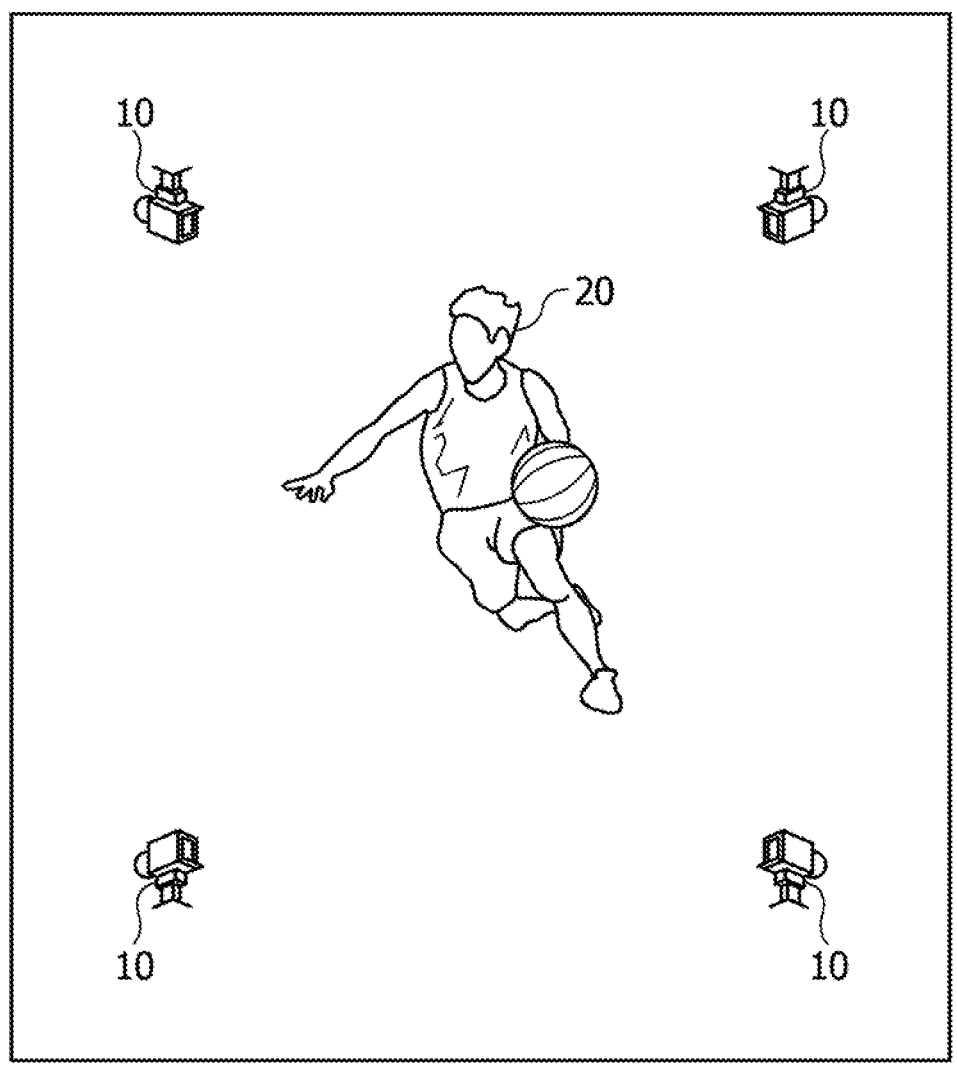
FIG. 11 is a diagram illustrating an exemplary player model generated from a camera.

FIG. 11 is a diagram illustrating an example of the player model generated from a camera. In the example illustrated in FIG. 11, a player model 20 is generated from each camera 10.

The generation unit 150*d* may also generate a three-dimensional model of the non-moving area for the non-moving area in a similar manner to the process of generating a player model, or may use a three-dimensional model of the field or background generated in advance. Alternatively, the generation unit 150*d* may generate a three-dimensional model of the non-moving area in a similar manner to a player model for the first time, and may reuse the generated three-dimensional model of the non-moving area.

The generation unit 150*d* combines the three-dimensional model of the non-moving area and the three-dimensional model (player model) of the moving area for each time, thereby generating the three-dimensional model data 140*h*. Note that the generation unit 150*d* may generate a three-dimensional model without separating the moving area and the non-moving area.

The generation unit 150*d* compares the coordinates of the player model of the three-dimensional model data 140*h* at a certain time with the coordinates of the player 2 in the tracking table 140*g* at the certain time, thereby assigning player identification data to the three-dimensional model.

For example, the generation unit 150*d* compares the coordinates of the player model of the three-dimensional model data 140*h* at a time t with the coordinates of the tracking data of the tracking table 140*g* at the time t, thereby identifying the tracking data closest to the coordinates of the player model. The generation unit 150*d* determines the player identification data associated with the identified tracking data as player identification data of the player model. The generation unit 150*d* adds player identification data to each player model of the three-dimensional model data 140*h*.

The free viewpoint video generation unit 150*e* is a processing unit that arranges a virtual camera on the three-dimensional space of the three-dimensional model data 140*h* and generates the free viewpoint video data 140*j*. The free viewpoint video generation unit 150*e* stores the generated free viewpoint video data 140*j* in the storage 140.

For example, the free viewpoint video generation unit 150*e* installs a virtual camera at the three-dimensional coordinates of the three-dimensional model data 140*h* corresponding to the three-dimensional coordinates of the virtual camera parameter 140*i*. The free viewpoint video generation unit 150*e* generates, for the installed virtual camera, an image included in the imaging range in the camera direction θ of the virtual camera parameter 140*i* as an imaging frame of the free viewpoint video.

For example, the free viewpoint video generation unit 150*e* refers to the camera parameter table 140*c*, selects a camera 10 having the optimum imaging direction for each surface (polygon) of the player model, and executes processing of applying the corresponding portion of the imaging frame captured by each selected camera 10, thereby performing rendering in which an image assumed to be viewed from the virtual camera is reproduced. The free viewpoint video generation unit 150*e* repeatedly executes the process described above for each frame to generate an imaging frame for each frame, thereby generating the free viewpoint video data 140*j*. The free viewpoint video generation unit 150*e* generates the free viewpoint video data 140*j* while updating the camera direction θ and the three-dimensional coordinates (X, Y, Z) at which the virtual camera is installed in accordance with the update of the virtual camera parameter 140*i*.

The synthesis unit 150*f* is a processing unit that combines a window for displaying player-related data registered in the player data table 140*e* with the free viewpoint video data 140J. Furthermore, the synthesis unit 150*f* also executes a process of combining the content data registered in the advertisement management table 140*d* with the free viewpoint video data 140*j*.

First, an example of the process in which the synthesis unit 150*f* combines the window for displaying the player-related data registered in the player data table 140e with the free viewpoint video data 140j will be described. The synthesis unit 150f specifies the background area of the player 2 on the free viewpoint video data 140j from the relationship between the position of the virtual camera and the position of the player 2 on the three-dimensional model, and combines a window for displaying the player-related data with the specified background area. The background area is an area near a player model 25, as will be described later. For example, in a case where the direction of the player model 25 on the opposite side relative to the virtual camera is the background direction, a position a predetermined distance away from the player model 25 toward the background direction is the area (background area) near the player model 25.

Figure 12:
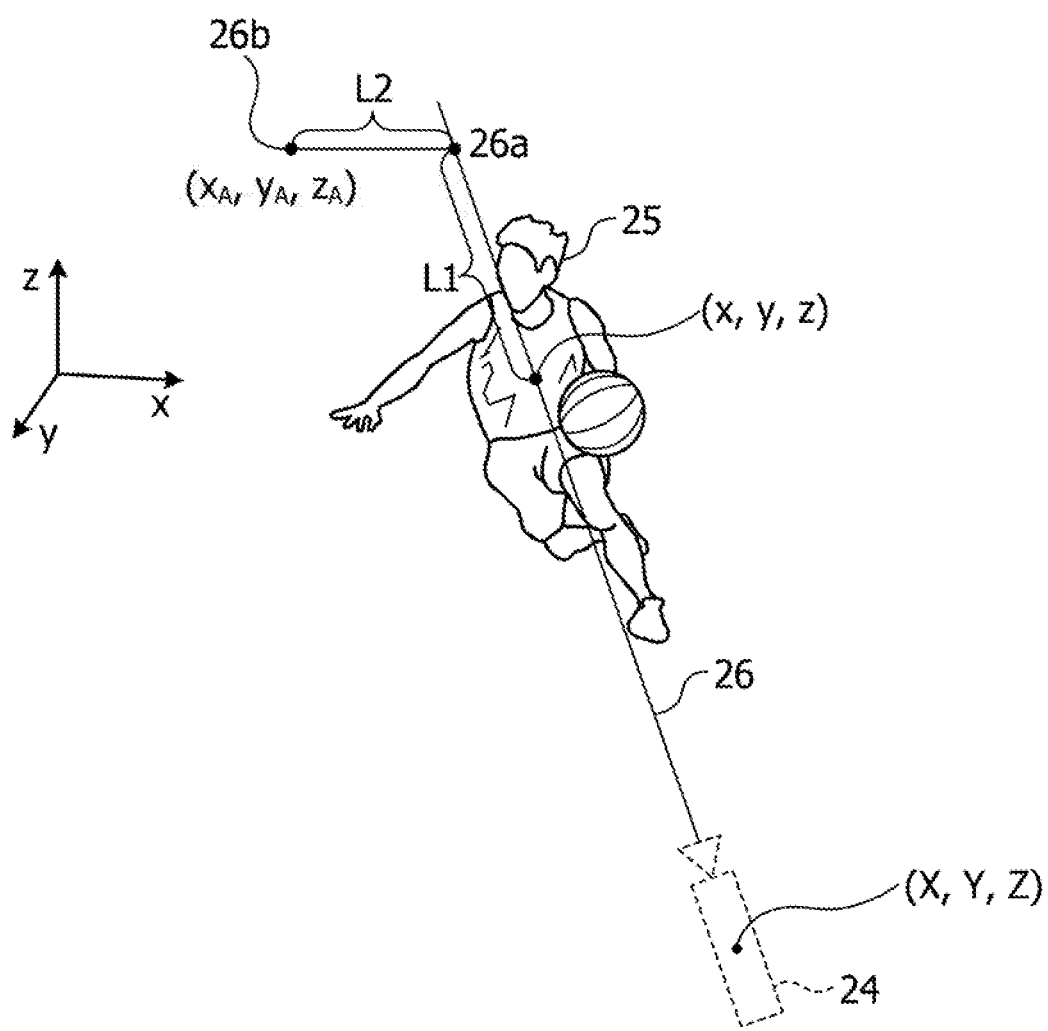
FIG. 12 is a diagram for illustrating an exemplary process for specifying a background area performed by a synthesis unit.

FIG. 12 is a diagram for illustrating an exemplary process for specifying a background area performed by the synthesis unit. As illustrated in FIG. 12, the three-dimensional coordinates of the virtual camera 24 are (X, Y, Z), and the three-dimensional coordinates of the player model 25 on the three-dimensional space are (x, y, z). The synthesis unit 150f calculate a straight line 26 that passes through the three-dimensional coordinates of the virtual camera 24 and the three-dimensional coordinates of the player model 25. The synthesis unit 150f identifies a point 26a moved by L1 from the three-dimensional coordinates (x, y, z) along the straight line 26 in the negative direction of the y axis, and calculates, as background coordinates, coordinates $(x_A, y_A, z_A)$ of a point 26b moved by L2 from the point 26a along the negative direction of the x axis. It is assumed that the values of L1 and L2 are set in advance.

The synthesis unit 150f converts the background coordinates $(x_A, y_A, z_A)$ on the three-dimensional model into background coordinates on the free viewpoint video data 140j, thereby specifying the background area of the player 2 on the free viewpoint video data. For example, the synthesis unit 150f converts the background coordinates $(x_A, y_A, z_A)$ on the three-dimensional model into the background coordinates on the free viewpoint video data 140j using a conversion table that defines a relationship between the coordinates on the three-dimensional model and the coordinates of the free viewpoint video data according to the virtual camera parameter 140i. Alternatively, the synthesis unit 150f may calculate the background coordinates on the free viewpoint video data 140j corresponding to the background coordinates $(x_A, y_A, z_A)$ on the three-dimensional model on the basis of the virtual camera parameter 140i and the background coordinates $(x_A, y_A, z_A)$ on the three-dimensional model.

Figure 13:
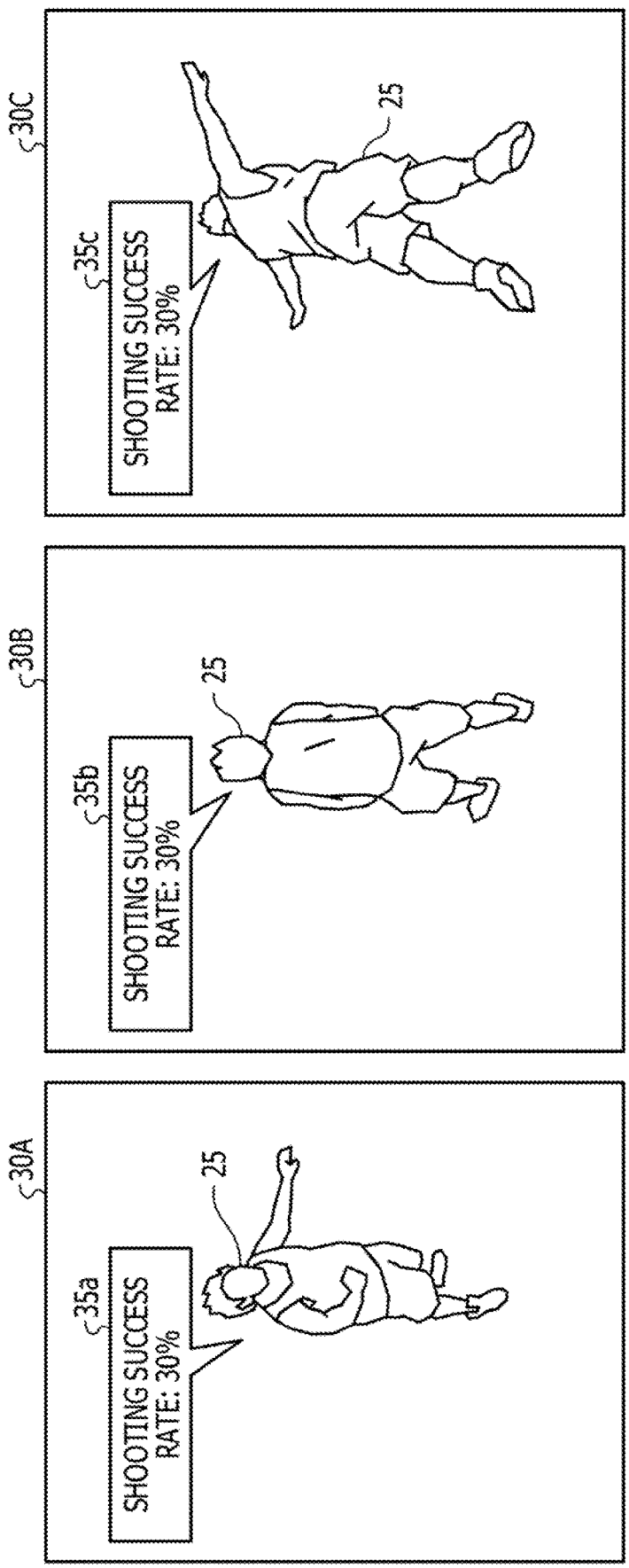
FIG. 13 is a diagram illustrating exemplary windows arranged in the background area.

FIG. 13 is a diagram illustrating exemplary windows arranged in the background area. Free viewpoint video data 30A illustrated in FIG. 13 shows a window 35a that is set in the case where a virtual camera (not illustrated) is arranged obliquely above in front of the player model 25. Free viewpoint video data 30B shows a window 35b that is set in the case where a virtual camera (not illustrated) is arranged behind the player model 25. Free viewpoint video data 30C shows a window 35c that is set in the case where a virtual camera (not illustrated) is arranged obliquely below the player model 25. As illustrated in FIG. 13, the respective windows 35a to 35c are arranged in the non-overlapping areas behind the player model 25, whereby it becomes possible to check the player-related data while checking motions of the player.

Here, the synthesis unit 150f compares the player identification data of the player model 25 with the player data table 140e to obtain the player-related data corresponding to the player model 25, and displays the player-related data in the window set as described above. The synthesis unit 150f repeatedly executes the process described above on each player model included in the three-dimensional model data 140h, thereby setting a window corresponding to each player model and displaying the player-related data corresponding to each player model. Note that the synthesis unit 150f may perform the processing of displaying the player-related data only on a preset player.

Note that the display timing at which the synthesis unit 150f displays the player-related data in the free viewpoint video data 140j may be, for example, any one of display timings among the following display timings 1 to 4, or may be another display timing.

Display timing 1: Display start time specified in advance.

Display timing 2: Display timing instructed by the user who operates the terminal device 60.

Display timing 3: Display timing instructed from a sensor server (not illustrated).

Display timing 4: Play switching timing during the game.

Supplemental explanation for the display timing 4 will be given. The synthesis unit 150f determines a play switching timing on the basis of ball tracking data stored in the tracking table 140g. For example, the synthesis unit 150f determines that it is the play switching timing in the case where coordinates of the ball change from within a predetermined range to outside the predetermined range (at the time when the ball is out).

Meanwhile, the end timing at which the synthesis unit 150f terminates the display of the player-related data displayed in the free viewpoint video data 140j may be, for example, any one of display end timings among the following display end timings 1 to 4, or may be another display end timing.

Display end timing 1: Display end time specified in advance.

Display end timing 2: Time a predetermined time after the time at which the display of the player-related data is started.

Display end timing 3: Display end timing instructed from a sensor server (not illustrated).

Display end timing 4: Switching timing of the next play during the game after the player-related data is displayed.

Next, an example of the process in which the synthesis unit 150f combines the content data registered in the advertisement management table 140d with the free viewpoint video data 140j will be described. First, the synthesis unit 150f executes the following process to obtain content data to be combined.

The synthesis unit 150f compares the user ID obtained from the receiving unit 150b with the user management table 140b, thereby determining a hobby of the user. Furthermore, the synthesis unit 150f compares the determined hobby with the advertisement management table 140d, thereby specifying content data corresponding to the hobby of the user. For example, referring to FIG. 6, the synthesis unit 150f obtains content data corresponding to the content ID of "C101" in the case where the hobby of the user is a "personal computer". Note that the synthesis unit 150f may obtain predetermined content data.

After obtaining the content data to be combined, the synthesis unit 150f determines a space in which the content data is to be arranged on the basis of the space management table 140f. For example, the synthesis unit 150f selects a space having a size closest to the size of the content data from the space management table 140f. The synthesis unit 150f arranges the content data at a position on the three-dimensional model data 140h corresponding to the coordinates of the arrangement of the selected space. In this manner, the synthesis unit 150f arranges the content data on the three-dimensional model data 140h, whereby the content data is combined with the free viewpoint video data 140j.

The display timing at which the synthesis unit 150f displays the content data in the free viewpoint video data 140j may be any one of the display timings among the display timings 1 to 4 described above, or may be another display timing. Furthermore, the end timing at which the synthesis unit 150f terminates the display of the content data being displayed may be any one of the display end timings among the display end timings 1 to 4 described above, or may be another display end timing.

Figure 14:
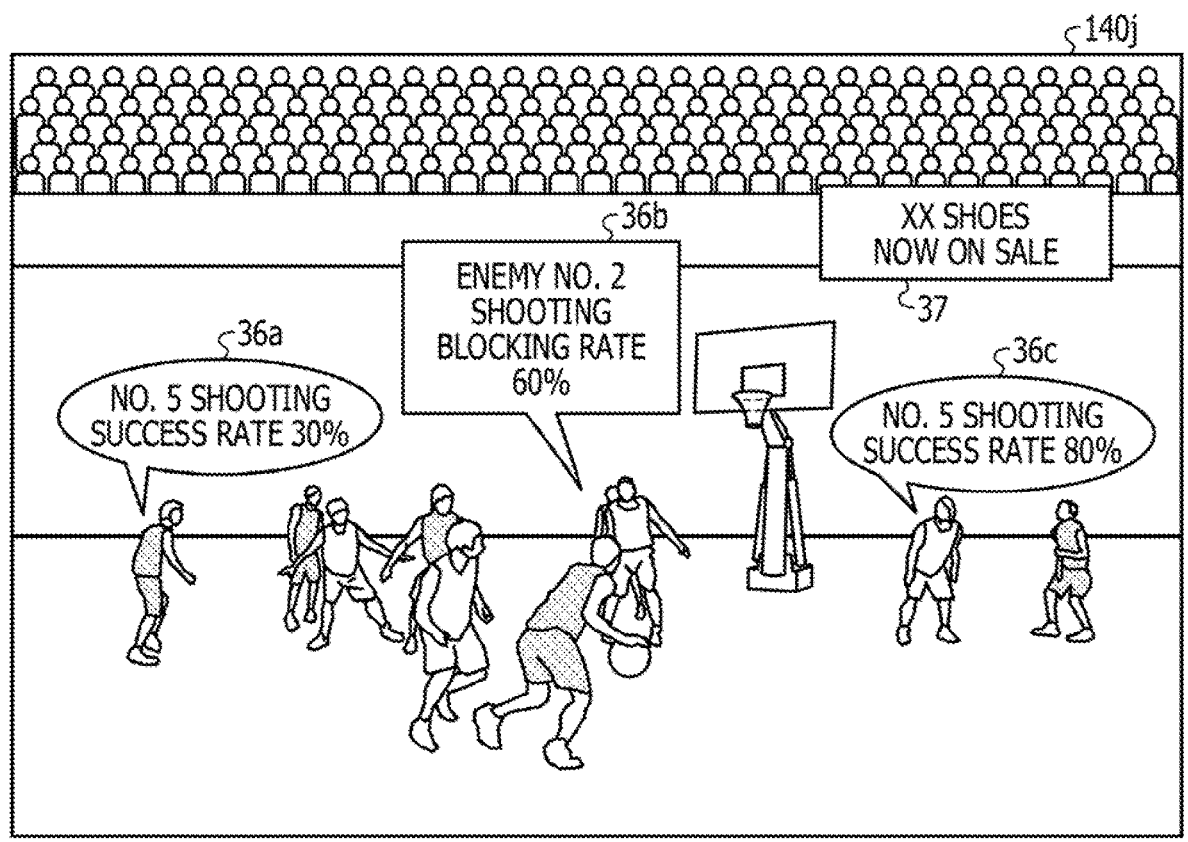
FIG. 14 is a diagram illustrating exemplary free viewpoint video data obtained by combining player-related data and content data.

FIG. 14 is a diagram illustrating an example of the free viewpoint video data obtained by combining player-related data and the content data. As illustrated in FIG. 14, in the free viewpoint video data 140j, windows 36a, 36b, and 36c indicating player-related data of respective players and content data 37 are combined.

The output unit 150g is a processing unit that transmits the free viewpoint video data 140j to the terminal device 60 and displays the free viewpoint video data 140j.

Figure 15:
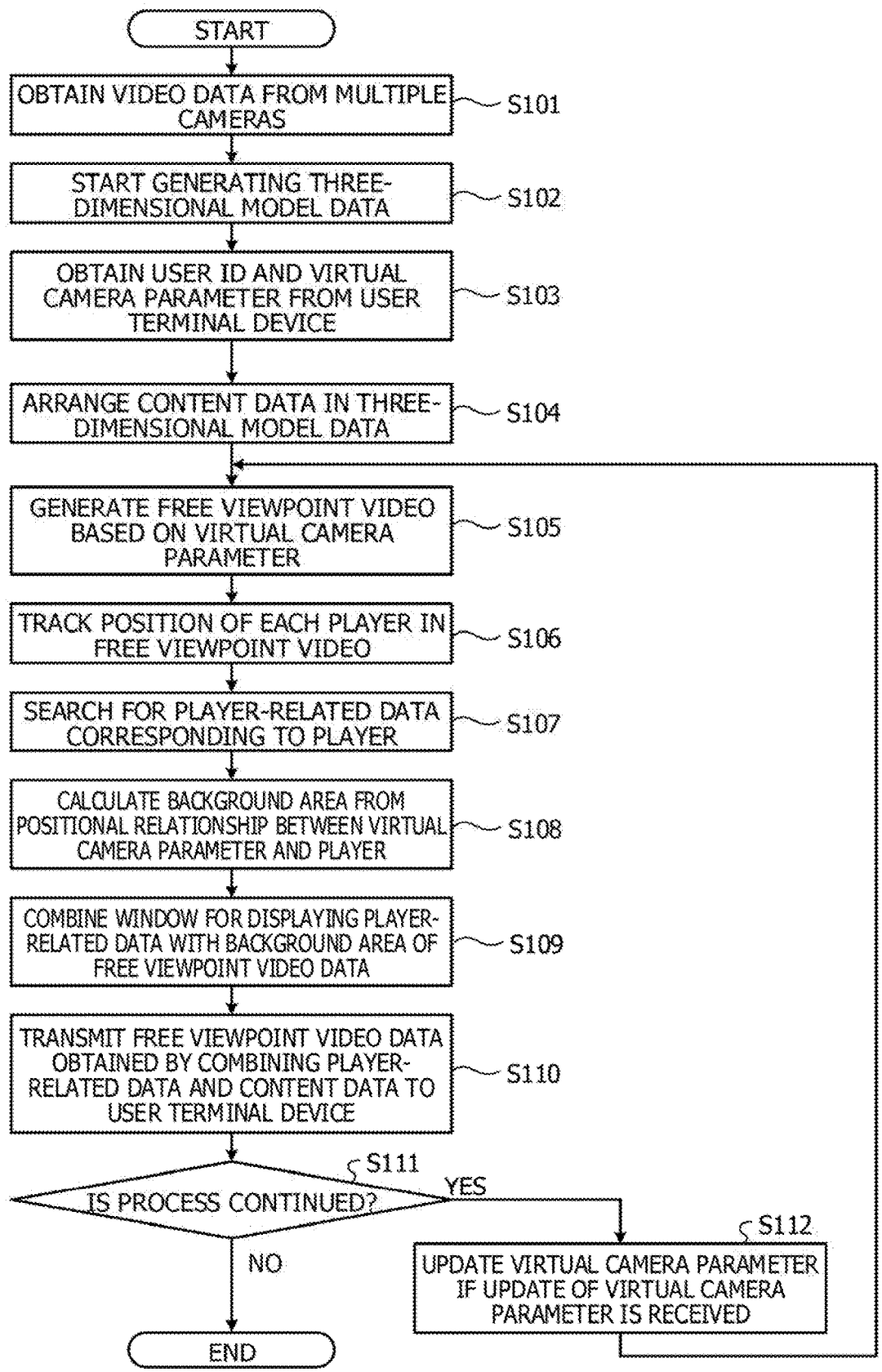
FIG. 15 is a flowchart illustrating a processing procedure of the video generation device according to the present example.

Next, an exemplary processing procedure of the video generation device 100 according to the present example will be described. FIG. 15 is a flowchart illustrating a processing procedure of the video generation device according to the present example. As illustrated in FIG. 15, the receiving unit 150b of the video generation device 100 obtains video data from a plurality of cameras 10 (step S101). The generation unit 150d of the video generation device 100 starts to generate the three-dimensional model data 140h (step S102).

The receiving unit 150b obtains, from the user terminal device 60, the user ID and the virtual camera parameter 140i (step S103). The synthesis unit 150f of the video generation device 100 arranges content data in the three-dimensional model data 140h (step S104).

The free viewpoint video generation unit 150e of the video generation device 100 generates free viewpoint video on the basis of the virtual camera parameter 140i (step S105). The tracking processing unit 150c of the video generation device 100 tracks the position of each player in the free viewpoint video (step S106).

The synthesis unit 150f searches for player-related data for the player (step S107). The synthesis unit 150f calculates a background area from the positional relationship between the virtual camera parameter and the player (player model) (step S108).

The synthesis unit 150f combines a window for displaying the player-related data with the background area of the free viewpoint video data 140j (step S109). The output unit 150g of the video generation device 100 transmits, to the user terminal device 60, the free viewpoint video data 140j obtained by combining the player-related data and the content data (step S110).

If the video generation device 100 continues the process (Yes in step S111), the process proceeds to step S112. On the other hand, if the video generation device 100 does not continue the process (No in step S111), the process is terminated. In step S112, if the receiving unit 150b of the video generation device 100 receives update of the virtual camera parameter 140i from the terminal device 60, the virtual camera parameter 140i is updated (step S112), and the process proceeds to step S105.

Next, effects of the video generation device 100 according to the present example will be described. The video generation device 100 specifies the background area near the position of the player included in the free viewpoint video data 140j, and executes the process of combining the window for displaying the player-related data with the specified background area. Accordingly, information related to the player can be displayed on the free viewpoint video data of the viewpoint desired by the user.

For example, in a case where data related to the player 2 is displayed at a position completely unrelated to the player 2 in free viewpoint video of a sport game, it becomes difficult to watch the game while concurrently viewing motions of the player and the information at a time. From such a viewpoint, it is preferable to display information related to the player near the position of the free viewpoint video of the player 2.

The video generation device 100 obtains user ID, specifies the content data corresponding to the user ID, and displays the specified content data in a predetermined area of the free viewpoint video data. Accordingly, it becomes possible to promote a product to the user while making it possible to view the free viewpoint video data of the viewpoint desired by the user.

Note that an exemplary case where the video generation device 100 obtains the user ID from the terminal device 60 has been described in the present example, it is not limited thereto. For example, the advertisement management table 140d retains information in which attribute information of the user and the content data are associated with each other. The video generation device 100 may obtain the attribute information of the user from the terminal device 60, and may obtain the content data from the advertisement management table 140d. For example, the attribute information of the user indicates information such as user's gender, age, and residential area.

The video generation device 100 specifies a background area in which comments are to be arranged on the basis of the virtual camera parameter 140i and the position of the player model. Accordingly, it becomes possible to suppress overlapping of the player-related data with the video of the player.

The video generation device 100 displays, in a window, information associated with the game of the player, past results of the player, information associated with comments made on the player, or information related to a sponsor in a contract with the player, for example, as player-related data. Accordingly, it becomes possible to notify the user of various kinds of information related to the player.

Note that there may be a case where information is not given properly if the synthesis unit 150f of the video generation device 100 combines the windows described above for all the players 2 included in the free viewpoint video data 140j so that various kinds of information are displayed at a time. In view of the above, the synthesis unit 150f may make a choice of the window to be combined. For example, in a case where the free viewpoint video data 140j includes a predetermined number of players 2 or more, the synthesis unit 150f combines a window of the player 2 designated in advance with the free viewpoint video data 140J. Alternatively, the synthesis unit 150f may perform a process of preferentially select a widow of a player with a higher ball possession rate or the like (player to be a key person in the game).

Figure 16:
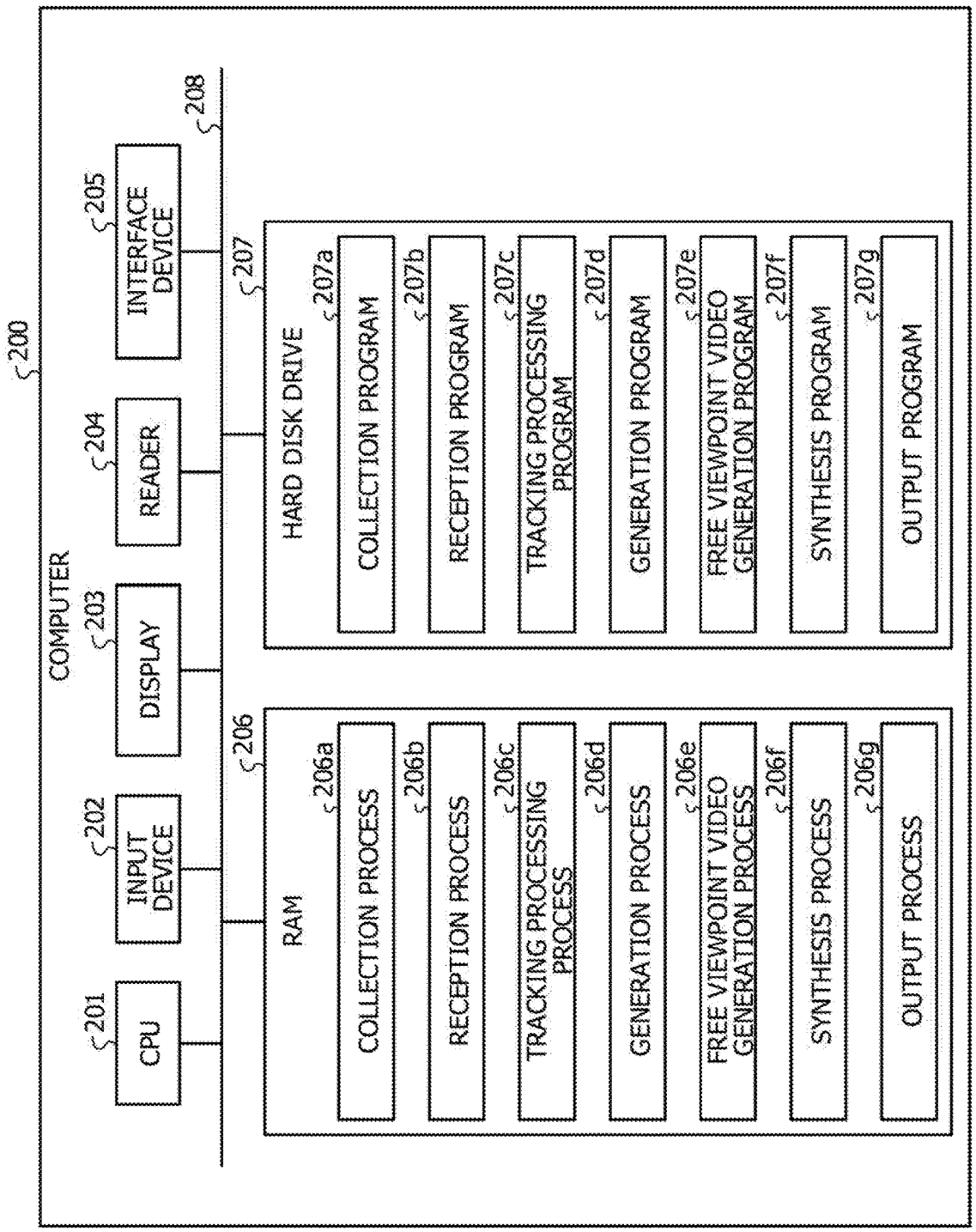
FIG. 16 is a diagram illustrating an exemplary hardware configuration of a computer that implements functions similar to those of the video generation device.

Here, an exemplary hardware configuration of a computer that implements functions similar to those of the video generation device 100 described in the present example will be described. FIG. 16 is a diagram illustrating an exemplary hardware configuration of the computer that implements functions similar to those of the video generation device.

As illustrated in FIG. 16, a computer 200 includes a CPU 201 that executes various calculation processes, an input device 202 that receives data input from a user, and a display 203. Furthermore, the computer 200 includes a reader 204 that reads programs and the like from a storage medium, and an interface device 205 that exchanges data with another computer via a wireless network. Furthermore, the computer 200 includes a RAM 206 that temporarily stores various kinds of information, and a hard disk drive 207. In addition, each of the devices 201 to 207 is connected to a bus 208.

The hard disk drive 207 has a collection program 207a, a reception program 207b, a tracking processing program 207c, and a generation program 207d. Furthermore, the hard disk drive 207 has a free viewpoint video generation program 207e, a synthesis program 207f, and an output program 207g.

The CPU 201 reads out the collection program 207a, the reception program 207b, the tracking processing program 207c, and the generation program 207d, and loads them in the RAM 206. The CPU 201 reads out the free viewpoint video generation program 207e, the synthesis program 207f, and the output program 207g, and loads them in the RAM 206.

The collection program 207a functions as a collection process 206a. The reception program 207b functions as a reception process 206b. The tracking processing program 207c functions as a tracking processing process 206c. The generation program 207d functions as a generation process 206d. The free viewpoint video generation program 207e functions as a free viewpoint video generation process 206e. The synthesis program 207f functions as a synthesis process 206f. The output program 207g functions as an output process 206g.

The processing of the collection process 206a corresponds to the processing of the collection unit 150a. The processing of the reception process 206b corresponds to the processing of the receiving unit 150b. The processing of the tracking processing process 206c corresponds to the processing of the tracking processing unit 150c. The processing of the generation process 206d corresponds to the processing of the generation unit 150d. The processing of the free viewpoint video generation process 206e corresponds to the processing of the free viewpoint video generation unit 150e. The processing of the synthesis process 206f corresponds to the processing of the synthesis unit 150f. The processing of the output process 206g corresponds to the processing of the output unit 150g.

Note that the respective programs 207a to 207g may not necessarily be stored in the hard disk drive 207 in advance. For example, each of the programs may be stored in a "portable physical medium" such as a flexible disk (FD), a CD-ROM, a DVD disk, a magneto-optical disk, or an IC card to be inserted in the computer 200. In addition, the computer 200 may read out the respective programs 207a to 207g to execute them.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a video generation program for causing a computer to execute a process comprising:
   tracking a position of a three-dimensional model of each of a plurality of subjects in a three-dimensional space generated by combining, for the subjects, a plurality of imaging frames captured by a plurality of cameras in a plurality of directions;
   obtaining positional information of the subjects included in the three-dimensional space;
   obtaining information related to the subjects;
   generating synthesized video by combining the information related to the subjects with a background area in the vicinity of the subjects based on the positional information of the subjects among areas of free viewpoint video generated on the basis of the three-dimensional model of each of the subjects; and
   controlling a display timing of the synthesized video by selecting, from among a plurality of display start timings to start a display of the synthesized video, one display start timing and selecting, from among a plurality of display end timings to end the display of the synthesized video, one display end timing,
   wherein the plurality of display start timings include a display start timing which is specified in advance, a display start timing which is instructed by a user of a terminal device, a display start timing which is instructed by a sensor server and a display start timing when switching a play during a game, and the plurality of display end timings include a display end timing which is specified in advance, a display end timing after a predetermined time elapses from the selected one display start timing, a display end timing which is instructed by the sensor server and a display end timing when switching to a next play during the game.

2. The non-transitory computer-readable recording medium according to claim 1, the program further causing a computer to execute a process comprising transmitting the synthesized video to a terminal device that specifies a viewpoint position of the free viewpoint video.

3. The non-transitory computer-readable recording medium according to claim 2, the program further causing a computer to execute a process comprising:
   obtaining attribute information of a user from the terminal device; and
   specifying advertisement information corresponding to the attribute information,
   wherein the process of generating the synthesized video generates the synthesized video by combining the advertisement information with a predetermined area of the free viewpoint video.

4. The non-transitory computer-readable recording medium according to claim 1, wherein the free viewpoint video is video obtained by imaging the three-dimensional model of each of the subjects from a virtual camera position in the three-dimensional space, and the process of generating the synthesized video specifies the background area on the basis of the virtual camera position and the positional information of the subjects.

5. The non-transitory computer-readable recording medium according to claim 1, wherein the information related to the subjects includes game information of the subjects, past results of the subjects, comment information directed to the subjects, or information associated with a sponsor in a contract with the subjects.

6. A method of generating video to be executed by a computer, the method comprising:
tracking a position of a three-dimensional model of each of a plurality of subjects in a three-dimensional space generated by combining, for the subjects, a plurality of imaging frames captured by a plurality of cameras in a plurality of directions;
obtaining positional information of the subjects included in the three-dimensional space; obtaining information related to the subjects;
generating synthesized video by combining the information related to the subjects with a background area in the vicinity of the subjects based on the positional information of the subjects among areas of free viewpoint video generated on the basis of the three-dimensional model of each of the subjects; and
controlling a display timing of the synthesized video by selecting, from among a plurality of display start timings to start a display of the synthesized video, one display start timing and selecting, from among a plurality of display end timings to end the display of the synthesized video, one display end timing,
wherein the plurality of display start timings include a display start timing which is specified in advance, a display start timing which is instructed by a user of a terminal device, a display start timing which is instructed by a sensor server and a display start timing when switching a play during a game, and the plurality of display end timings include a display end timing which is specified in advance, a display end timing after a predetermined time elapses from the selected one display start timing, a display end timing which is instructed by the sensor server and a display end timing when switching to a next play during the game.

7. The method according to claim 6, further comprising:
transmitting the synthesized video to a terminal device that specifies a viewpoint position of the free viewpoint video.

8. The method according to claim 7, further comprising:
obtaining attribute information of a user from the terminal device; and
specifying advertisement information corresponding to the attribute information,
wherein the process of generating the synthesized video generates the synthesized video by combining the advertisement information with a predetermined area of the free viewpoint video.

9. The method according to claim 6, wherein the free viewpoint video is video obtained by imaging the three-dimensional model of each of the subjects from a virtual camera position in the three-dimensional space, and the process of generating the synthesized video specifies the background area on the basis of the virtual camera position and the positional information of the subjects.

10. The method according to claim 6, wherein the information related to the subjects includes game information of the subjects, past results of the subjects, comment information directed to the subjects, or information associated with a sponsor in a contract with the subjects.

11. An information processing device comprising:
a memory;
a processor coupled to the memory and configured to:
obtain, for a plurality of subjects, a plurality of imaging frames captured in a plurality of directions from a plurality of cameras;
track a position of a three-dimensional model of each of the subjects in a three-dimensional space generated by combining the imaging frames;
obtain positional information of the subjects included in the three-dimensional space, obtains information related to the subjects;
generate synthesized video by combining the information related to the subjects with a background area in the vicinity of the subjects based on the positional information of the subjects among areas of free viewpoint video generated on the basis of the three-dimensional model of each of the subjects; and
control a display timing of the synthesized video by selecting, from among a plurality of display start timings to start a display of the synthesized video, one display start timing and selecting, from among a plurality of display end timings to end the display of the synthesized video, one display end timing,
wherein the plurality of display start timings include a display start timing which is specified in advance, a display start timing which is instructed by a user of a terminal device, a display start timing which is instructed by a sensor server and a display start timing when switching a play during a game, and the plurality of display end timings include a display end timing which is specified in advance, a display end timing after a predetermined time elapses from the selected one display start timing, a display end timing which is instructed by the sensor server and a display end timing when switching to a next play during the game.

12. The information processing device according to claim 11, wherein the processor is configured to:
transmit the synthesized video to a terminal device that specifies a viewpoint position of the free viewpoint video.

13. The information processing device according to claim 12, wherein the processor is configured to:
obtain attribute information of a user from the terminal device; and
generate the synthesized video by specifying advertisement information corresponding to the attribute information and combining the advertisement information with a predetermined area of the free viewpoint video.

14. The information processing device according to claim 11, wherein the free viewpoint video is video obtained by imaging the three-dimensional model of each of the subjects from a virtual camera position in the three-dimensional space, and the processor is configured to specify the background area based on the virtual camera position and the positional information of the subjects.

15. The information processing device according to claim 11, wherein the information related to the subjects includes game information of the subjects, past results of the subjects, comment information directed to the subjects, or information associated with a sponsor in a contract with the subjects.

* * * * *